United States Patent
Kawai et al.

(10) Patent No.: US 12,394,240 B2
(45) Date of Patent: Aug. 19, 2025

(54) PICTURE RECOGNITION APPARATUS, PICTURE RECOGNITION METHOD, AND NON-TRANSITORY PROGRAM RECORDING MEDIUM DISPLAYING A GENERATED DISPLAY PICTURE

(71) Applicant: JVCKENWOOD Corporation, Yokohama (JP)

(72) Inventors: Nobuo Kawai, Yokohama (JP); Masahiro Onda, Yokohama (JP); Toshio Mori, Yokohama (JP); Tsuyoshi Watanabe, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 368 days.

(21) Appl. No.: 17/932,697

(22) Filed: Sep. 16, 2022

(65) Prior Publication Data

US 2023/0014663 A1 Jan. 19, 2023

Related U.S. Application Data

(63) Continuation of application No. PCT/JP2021/030667, filed on Aug. 20, 2021.

(30) Foreign Application Priority Data

Oct. 7, 2020 (JP) .................................. 2020-169598

(51) Int. Cl.
*G06V 40/10* (2022.01)
*G06F 3/14* (2006.01)
(Continued)

(52) U.S. Cl.
CPC .............. *G06V 40/103* (2022.01); *G06F 3/14* (2013.01); *G06T 7/62* (2017.01); *G06T 7/70* (2017.01);
(Continued)

(58) Field of Classification Search
None
See application file for complete search history.

(56) References Cited

U.S. PATENT DOCUMENTS

2023/0014663 A1* 1/2023 Kawai ...................... G06T 7/62

FOREIGN PATENT DOCUMENTS

JP 2019059247 A 4/2019
JP 2019075150 A 5/2019
(Continued)

OTHER PUBLICATIONS

Google Translation of WO-2015152304-A1 in English, Publicly accessed Nov. 12, 2024, Available online at https://patents.google.com/patent/WO2015152304A1/en?oq=JP+2019075150+ (Year: 2015).*

(Continued)

*Primary Examiner* — Tahmina N Ansari
(74) *Attorney, Agent, or Firm* — Shih IP Law Group, PLLC

(57) ABSTRACT

A picture recognition apparatus includes: a person detector that detects a person included in a captured picture and specifies a detection position and a detection size of the person in the captured picture; a frame line determiner that determines a size of a frame line different from the detection size on the basis of the specified detection position of the person; a picture generator that generates a display picture in which the frame line of the determined size is superimposed on the detection position of the captured picture; and a display controller that causes a display device to display the generated display picture.

7 Claims, 6 Drawing Sheets

(51) Int. Cl.
  *G06T 7/62* (2017.01)
  *G06T 7/70* (2017.01)
  *G06V 10/25* (2022.01)
(52) U.S. Cl.
  CPC .......... *G06V 10/25* (2022.01); *G06V 2201/07* (2022.01)

(56) References Cited

FOREIGN PATENT DOCUMENTS

| JP | 2019-204374 A | 11/2019 | |
|---|---|---|---|
| WO | WO-2015152304 A1 * | 10/2015 | ......... G06K 9/00805 |

OTHER PUBLICATIONS

International Search Report for the corresponding PCT Application No. PCT/JP2021/030667 mailed Nov. 2, 2021, 4 pages.
European Extended Search Report from EP Application No. 21877249.9 mailed Feb. 14, 2024, 8 pages.

* cited by examiner

PICTURE RECOGNITION APPARATUS, PICTURE RECOGNITION METHOD, AND NON-TRANSITORY PROGRAM RECORDING MEDIUM DISPLAYING A GENERATED DISPLAY PICTURE

CROSS REFERENCE TO RELATED APPLICATION

This application is a continuation of application No. PCT/JP2021/030667, filed on Aug. 20, 2021, and claims the benefit of priority from the prior Japanese Patent Application No. 2020-169598, filed on Oct. 7, 2020, the entire content of which is incorporated herein by reference.

BACKGROUND OF THE INVENTION

1. Field of the Disclosure

The present disclosure relates to a picture recognition apparatus, a picture recognition method, and a non-transitory program medium.

2. Description of the Related Art

There is known technology for detecting a person included in a captured picture, and generating and displaying a picture in which a rectangular frame line is superimposed on the detected person. A size of the rectangular frame line superimposed and displayed on the captured picture may have an aspect ratio of 2:1 so as to surround a range of the detected person. In addition, technology for displaying a frame line having a size determined to be a standard size (for example, corresponding to a height of 170 cm) on the basis of a distance to a detected person as in JP2019-204374A is also disclosed.

In a case where the size of the frame line is set to a fixed value regardless of the size of the person, there is a possibility that an attribute such as whether the person is an adult or a child cannot be appropriately grasped. On the other hand, in a case where the size of the frame line corresponds to the size of the person, the size of the frame line superimposed on a short person such as the child becomes small. In a case where the size of the frame line is small, there is a possibility of giving an impression that a person exists farther than an actual position at the time of viewing display of a captured picture in which the frame line is superimposed, and there is a possibility of erroneously grasping a position of the short person existing nearby.

The present disclosure has been made in view of the above circumstances, and provides technology for reducing a possibility of erroneously grasping a position of a detected person.

SUMMARY OF THE INVENTION

A picture recognition apparatus according to an embodiment includes: a picture acquirer that acquires a captured picture; a person detector that detects a person included in the captured picture acquired by the picture acquirer and specifies a detection position and a detection size of the person in the captured picture; a frame line determiner that determines a size of a frame line different from the detection size on the basis of the detection position of the person specified by the person detector; a picture generator that generates a display picture in which the frame line of the size determined by the frame line determiner is superimposed on the detection position of the captured picture; and a display controller that causes a display device to display the display picture generated by the picture generator.

Another embodiment is a picture recognition method executed by the picture recognition apparatus. This method includes: acquiring a captured picture; detecting a person included in the acquired captured picture and specifying a detection position and a detection size of the person in the captured picture; determining a size of a frame line different from the detection size on the basis of the specified detection position of the person; generating a display picture in which the frame line of the determined size is superimposed on the detection position of the captured picture; and causing a display device to display the generated display picture.

Still another embodiment is a non-transitory program recording medium comprising a program. This program causes a computer to execute: acquiring a captured picture; detecting a person included in the acquired captured picture and specifying a detection position and a detection size of the person in the captured picture; determining a size of a frame line different from the detection size on the basis of the specified detection position of the person; generating a display picture in which the frame line of the determined size is superimposed on the detection position of the captured picture; and causing a display device to display the generated display picture.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE PREFERRED EMBODIMENT

Figure 1:
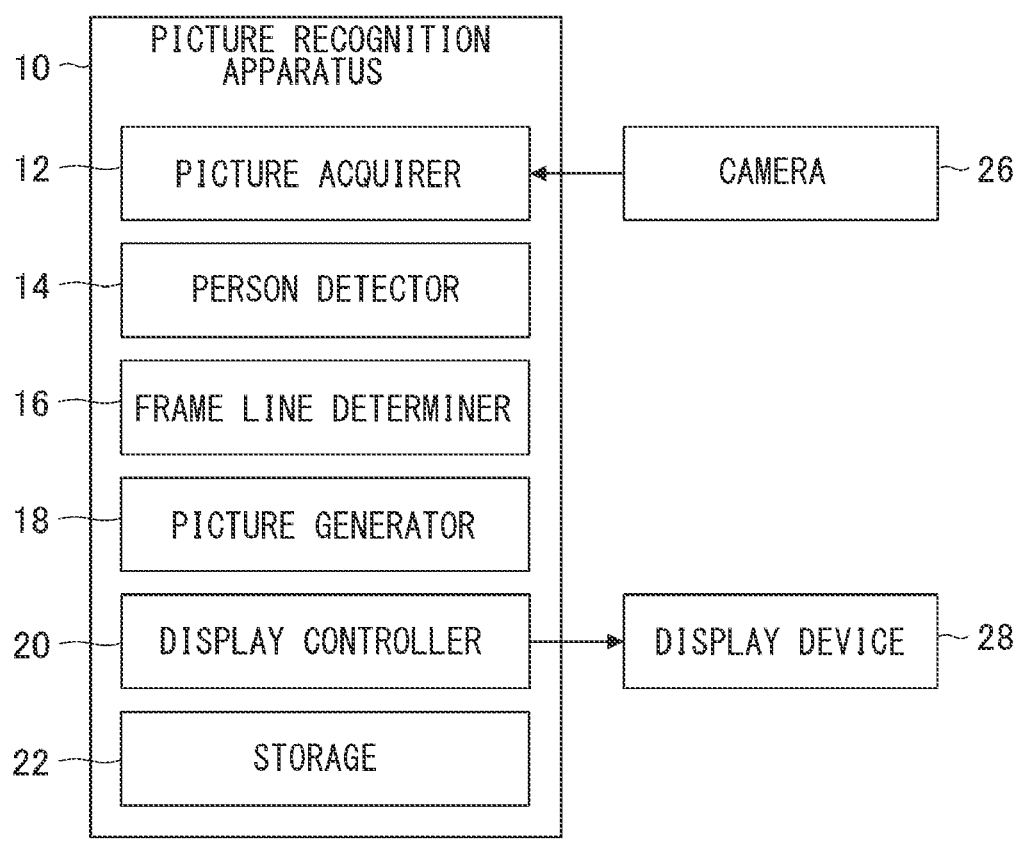
FIG. 1 is a block diagram schematically illustrating a functional configuration of a picture recognition apparatus according to a first embodiment.

The invention will now be described by reference to the preferred embodiments. This does not intend to limit the scope of the present invention, but to exemplify the invention.

Hereinafter, embodiments of the present invention will be described with reference to the drawings. Specific numerical values and the like illustrated in such embodiments are merely examples for facilitating understanding of the invention, and do not limit the present invention unless otherwise specified. In the drawings, elements not directly related to the present invention are not illustrated.

First Embodiment

Before describing the first embodiment in detail, an outline will be described. In the first embodiment, a person included in a captured picture is detected, and a display picture in which a frame line surrounding the detected person is superimposed on the captured picture is generated and displayed. In the present embodiment, a frame line having a size corresponding to a detection size of the detected person is superimposed, and when a height of the detected person is less than a predetermined value such as less than 120 cm, a display picture in which a frame line having a size larger than the detection size of the person in a vertical direction is superimposed is generated. According to the present embodiment, by superimposing a frame line having a size larger than the detection size on a person having a height less than the predetermined value, a possibility of erroneously recognizing that the detected person exists farther than an actual position due to a small size of the frame line of the detected person in the vertical direction is reduced, and a possibility of erroneously grasping a position of the detected person is reduced.

FIG. 1 is a block diagram schematically illustrating a functional configuration of a picture recognition apparatus 10 according to the first embodiment. The picture recognition apparatus 10 includes a picture acquirer 12, a person detector 14, a frame line determiner 16, a picture generator 18, a display controller 20, and a storage 22. In the present embodiment, a case where the picture recognition apparatus 10 is mounted on a vehicle will be exemplified. The picture recognition apparatus 10 is, for example, an apparatus mounted on a vehicle, and includes a control device such as a central processing unit (CPU) provided in the vehicle. The picture recognition apparatus 10 may be structured using a navigation system or the like provided in the vehicle. Further, the picture recognition apparatus 10 may be realized by a portable device such as a video camera device or a smartphone. The picture recognition apparatus 10 may include at least one of a camera 26 and a display device 28.

Each functional block illustrated in the present embodiment can be realized by an element including a CPU or a memory of a computer or a mechanical device in terms of hardware, and can be realized by a computer program or the like in terms of software. However, here, functional blocks realized by cooperation of these are illustrated. Therefore, those skilled in the art will understand that these functional blocks can be realized in various forms by combining hardware and software.

The picture acquirer 12 acquires a captured picture captured by the camera 26. The camera 26 is mounted on a vehicle and captures a picture around the vehicle. The camera 26 captures, for example, a picture in front of the vehicle. The camera 26 may capture a picture behind the vehicle or a picture beside the vehicle. The camera 26 is structured to capture a picture of visible light. The camera 26 may be structured to capture red, green, and blue color pictures, or may be structured to capture a monochrome picture of visible light.

The camera 26 may be structured to capture a picture of infrared light. The camera 26 may be so-called infrared thermography, and may be capable of capturing a picture of a neighboring temperature distribution of the vehicle and specifying a neighboring heat source of the vehicle. The camera 26 may be structured to detect mid-infrared light having a wavelength of about 2 μm to 5 μm, or may be structured to detect far-infrared light having a wavelength of about 8 μm to 14 μm.

The captured picture captured by the camera 26 and acquired by the picture acquirer 12 is, for example, a moving picture in which pictures of 30 frames per second are continuous. Processing described below is performed on the moving picture as needed.

Figure 2:
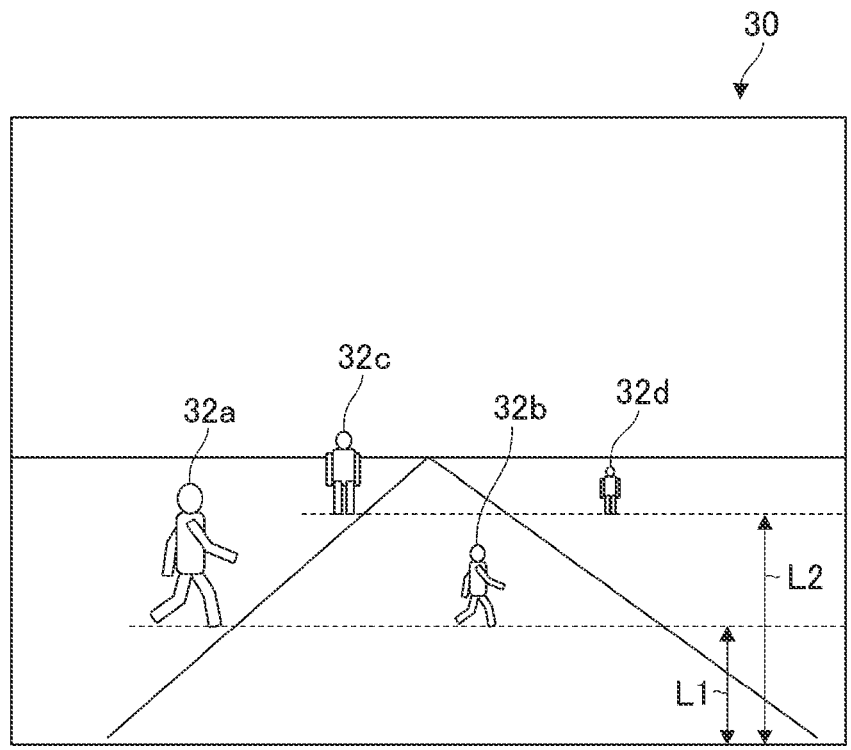
FIG. 2 is a diagram illustrating an example of a captured picture.

FIG. 2 illustrates an example of a captured picture 30 acquired by the picture acquirer 12. In the example of FIG. 2, a plurality of persons 32a, 32b, 32c, and 32d are included in the captured picture 30. The first person 32a and the second person 32b are located at a first distance L1 at which a distance from the vehicle is relatively short. The third person 32c and the fourth person 32d are located at a second distance L2 at which a distance from the vehicle is relatively long. The first distance L1 corresponds to, for example, a distance of about 15 m to 20 m from the vehicle. The second distance L2 corresponds to, for example, a distance of about 40 m to 50 m from the vehicle.

The first person 32a and the third person 32c are persons having a height of about 170 cm, and the second person 32b and the fourth person 32d are persons having a height of about 100 cm and are so-called short persons. In the illustrated example, an appearance size of the second person 32b who is a short person is about the same as an appearance size of the third person 32c, that is, a detection size in the captured picture 30. The detection size is a size on the picture in the captured picture.

The person detector 14 detects a person included in the captured picture acquired by the picture acquirer 12. The person detector 14 searches for a pedestrian, a cyclist (a person who rides a bicycle), and the like using a person recognition dictionary. The person detector 14 searches the captured picture for a person using the person recognition dictionary, and calculates a person score indicating the possibility that the person exists in a searched section. For example, the person detector 14 detects the person as a person when the person score of the searched section is larger than or equal to a predetermined threshold. The person recognition dictionary used by the person detector 14 is generated by machine learning using a model in which a captured picture of a person or the like is input and a person score is output. As the model used for the machine learning, a convolutional neural network (CNN) or the like can be used. In the example of FIG. 2, the person detector 14 performs processing of detecting a person on the captured picture 30 acquired by the picture acquirer 12, and detects a plurality of persons 32a, 32b, 32c, and 32d.

A shape of the section used for the search by the person detector 14 is determined in advance according to the person recognition dictionary to be used. In the person recognition dictionary according to the present embodiment, the section to be searched is a rectangle, and a ratio of picture sizes in a vertical direction and a horizontal direction of the section is determined to be about 2:1. The shape of the section used for the search corresponds to, for example, picture sizes in the vertical direction and the horizontal direction of a learning picture used in the machine learning for generating the person recognition dictionary.

The person detector 14 specifies a detection position and a detection size of the detected person. The person detector 14 assigns a tag number to the detected person, and stores the detection position and the detection size for each tag number in the storage 22. The detection position is the position coordinates of a section where a person is detected in the captured picture 30, and is determined by, for example, the position coordinates at the center of a lower end of the section. The lower end of the section where the person is detected corresponds to a position at the feet of the person, and can also be said to be a ground position where the person is in contact with the ground. The ground position of the person can be used to estimate a distance to the person. The detection size is a size of the section in which the person is detected, and is determined by, for example, the picture size in the vertical direction of the section in which the person is detected. The detection size can be used to estimate the height of the person.

The person detector 14 may calculate a distance to the detected person and store the calculated distance in the storage 22 for each tag number. The person detector 14 may calculate the distance to the person on the basis of the position coordinates in the vertical direction of the ground position of the detected person in the captured picture. The person detector 14 may calculate the distance to the person using a table or a mathematical formula indicating a correlation between the position coordinates in the vertical direction of the captured picture and the distance. The distance to the person in this case is a distance from the vehicle on which the camera 26 is mounted to the person.

The person detector 14 calculates a height of the detected person, and stores the calculated height in the storage 22 for each tag number. The person detector 14 calculates the height of the person on the basis of the ground position of the detected person and the detection size in the vertical direction. The person detector 14 may calculate the height of the person using a table or a mathematical formula indicating a ratio between the detection size and the height determined according to the position coordinates in the vertical direction of the captured picture 30.

Figure 3:
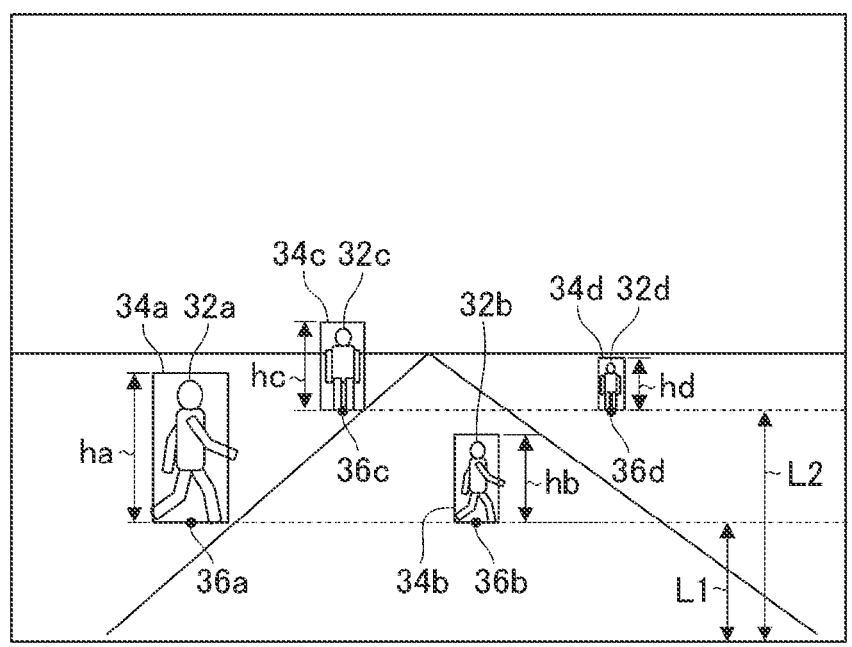
FIG. 3 is a diagram schematically illustrating a detection position and a detection size of a person.

FIG. 3 is a diagram schematically illustrating detection positions and detection sizes of the persons 32a to 32d detected in the captured picture 30 illustrated in FIG. 2. FIG. 3 illustrates sections 34a, 34b, 34c, and 34d in which the persons 32a to 32d are detected in the captured picture 30 of FIG. 2, and ground positions 36a, 36b, 36c, and 36d of the persons 32a to 32d. The person detector 14 stores at least vertical sizes ha to hd of the sections 34a to 34d detected as the detection sizes of the persons 32a to 32d in the storage 22. The vertical sizes ha to hd of the sections 34a to 34d correspond to vertical picture sizes of the persons 32a to 32d in the captured picture 30. The vertical sizes ha to hd of the sections 34a to 34d are determined by the vertical picture sizes from the feet to the heads of the persons 32a to 32d. The person detector 14 stores the coordinates of the ground positions 36a to 36d located at the centers of the lower ends of the sections 34a to 34d in the storage 22 as the detection positions of the persons 32a to 32d.

The frame line determiner 16 determines whether or not a frame line is superimposed on the captured picture 30 on the basis of a detection result of the person detector 14, and determines a position and a size of the frame line to be superimposed when the frame line is superimposed. The picture generator 18 generates a display picture by superimposing the frame line having the position and the size determined by the frame line determiner 16 on the captured picture 30. The display controller 20 causes the display device 28 to display the display picture generated by the picture generator 18. The display device 28 is, for example, a display mounted on the vehicle.

The frame line determiner 16 determines whether or not to superimpose the frame line on the basis of a distance from the vehicle to the person. The frame line determiner 16 determines to superimpose the frame line when the distance from the vehicle to the person is less than a threshold (for example, 40 m), and determines not to superimpose the frame line when the distance from the vehicle to the person is larger than or equal to the threshold (for example, 40 m). The frame line determiner 16 may determine a color of the frame line to be superimposed according to the distance from the vehicle to the person. For example, when the distance to the person is less than a first threshold (for example, 20 m), a red frame line may be used, and when the distance to the person is larger than or equal to the first threshold (for example, 20 m) and less than a second threshold (for example, 40 m), a yellow frame line may be used. Note that, when the distance to the person is larger than or equal to the second threshold, the frame line may be omitted. The frame line determiner 16 stores the necessity of the determined frame line or the color of the frame line in the storage 22 for each tag number.

The frame line determiner 16 determines the size of the frame line on the basis of a height of the person whose distance is less than the threshold. The frame line determiner 16 determines the size of the frame line according to the height of the person. When the height of the person is larger than or equal to a predetermined value such as larger than or equal to 120 cm, the frame line determiner 16 sets the size of the frame line in the vertical direction to a size equivalent to the detection size of the person. When the height of the person is less than a predetermined value such as less than 120 cm, that is, when the person is short, the frame line determiner 16 sets the size of the frame line in the vertical direction to a size larger than the detection size of the person. The size in the vertical direction of the frame line of the person whose height is less than the predetermined value is, for example, a large size such that the height corresponds to 150 cm to 170 cm at the detection position of the person, and has a size larger than the detection size of the detected person.

The size of the frame line for the person whose height is larger than or equal to the predetermined value may change according to the detection size of the person, and may change according to the height of the person and the distance to the person. That is, the size of the frame line for the person whose height is larger than or equal to the predetermined value is proportional to the height of the person and inversely proportional to the distance to the person. When the distance to the person is the same, the size of the frame line changes according to the height of the person. For example, the frame line superimposed on a person with a height of 180 cm located at the distance of 20 m is larger than the frame line superimposed on a person with a height of 160 cm located at the distance of 20 m in the vertical direction. Further, when the height of the person is the same, the size of the frame line changes according to the distance to the person. For example, the frame line superimposed on a person with a height of 180 cm located at the distance of 10 m is larger than the frame line superimposed on a person with a height of 180 cm located at the distance of 20 m in the vertical direction.

The size of the frame line for the person whose height is less than the predetermined value does not necessarily follow the detection size of the person. For example, for a person whose height is less than a predetermined value, a frame line having a fixed size may be set. In this case, for example, in a case where a person having a height of 100 cm and a person having a height of 90 cm are detected, a frame line having a size corresponding to the height of 180 cm is set for both persons. Further, for a person whose height is less than the predetermined value, the size of the frame line may be set such that the size of the frame line in the vertical direction becomes a value obtained by multiplying the height of the detected person by a coefficient such as 1.5. In this case, for example, a frame line having a size corresponding to a height of 150 cm is set for a person having a height of 100 cm, and a frame line having a size corresponding to a height of 135 cm is set for a person having a height of 90 cm.

Figure 4:
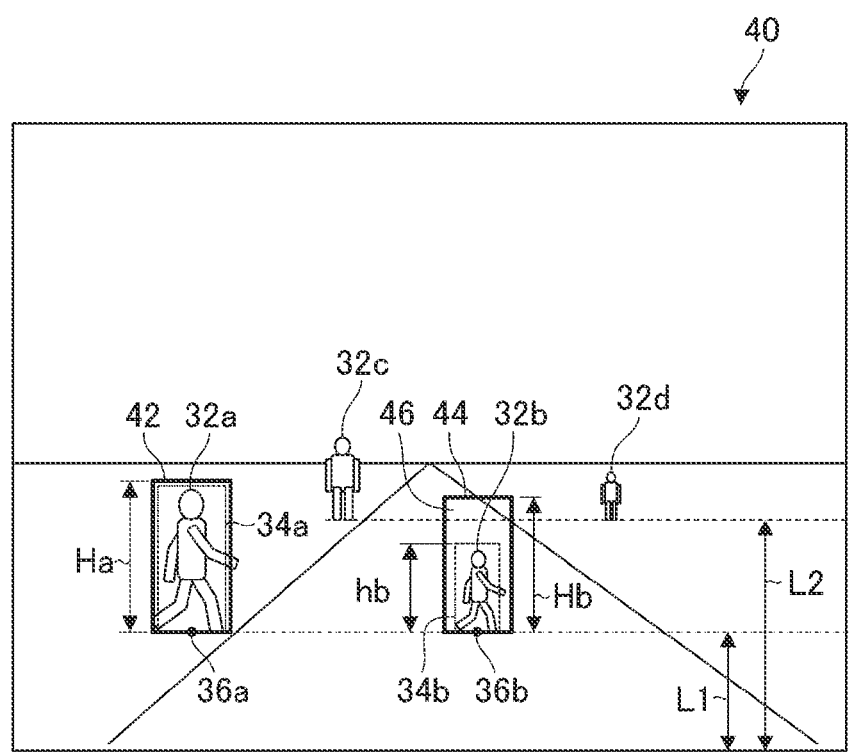
FIG. 4 is a diagram illustrating an example of a display picture in which a frame line is superimposed.

FIG. 4 is a diagram illustrating an example of a display picture 40 in which frame lines 42 and 44 are superimposed. In FIG. 4, since the height of the first person 32a in FIG. 2 is determined to be larger than or equal to the predetermined value on the basis of the ground position 36a and a vertical size Ha in in the display picture 40, the frame line 42 of the detection size of the first person 32a is superimposed. That is, the frame line 42 having an aspect ratio of 2:1 is superimposed with the vertical detection size Ha of the first person 32a as a vertical size. Since the height of the second person 32b is determined to be less than the predetermined value on the basis of the ground position 36a and a vertical size Hb in the display picture 40, the frame line 44 having a size larger than the detection size of the second person 32b in the vertical direction is superimposed as a frame line having a size different from the detection size of the second person 32b. In FIG. 4, the frame lines 42 and 44 drawn in the display picture 40 are indicated by thick lines. The frame lines of the first section 34a and the second section 34b indicated by broken lines in FIG. 4 are not drawn in the display picture 40. In FIG. 4, the frame lines 42 and 44 are superimposed only on the first person 32a and the second person 32b located at the first distance L1 that is a short distance, and frame lines are not superimposed on the third person 32c and the fourth person 32d located at the second distance L2 that is a long distance.

The frame line 42 superimposed on the first person 32a whose height is larger than or equal to the predetermined value has a size corresponding to the detection size of the first person 32a, and has, for example, the same size as the first section 34a where the first person 32a is detected. The size of the frame line 42 may be slightly different from the size of the first section 34a, and may be different from the size of the first section 34a by for example, about 5% to 10%. Therefore, the vertical size Ha of the frame line 42 may be the same as, slightly smaller than, or slightly larger than the vertical size ha of the first section 34a. The aspect ratio of the frame line 42 is the same as the aspect ratio of the detection size of the first person 32a, and is 2:1. The frame line 42 is superimposed on the basis of the ground position 36a of the first person 32a, and is superimposed such that the center of the lower end of the frame line 42 is matched with the ground position 36a.

The frame line 44 superimposed on the second person 32b whose height is less than the predetermined value is larger than the detection size of the second person 32b. The vertical size Hb of the frame line 44 is significantly larger than the vertical size hb of the second section 34b where the second person 32b is detected, and is, for example, 10% or more larger. In the example of FIG. 4, the vertical size Hb of the frame line 44 is about 1.5 times the vertical size hb of the second section 34b. The aspect ratio of the frame line 44 is the same as the aspect ratio of the detection size of the second person 32b, and is 2:1. That is, the aspect ratio of the frame line 44 is the same as the aspect ratio of the frame line 42. The frame line 44 is superimposed on the basis of the ground position 36b of the second person 32b, and is superimposed such that the center of the lower end of the frame line 44 is matched with the ground position 36b. As a result, a gap 46 exists between a head of the second person 32b and an upper end of the frame line 44. A vertical size of the gap 46 is, for example, 10% or more of the vertical size hb of the second section 34b, and is, for example, about 20% to 50%.

According to the display picture 40 of FIG. 4, the frame line 44 larger than the actual height is superimposed on the second person 32b. As a result, it is possible to cause the second person 32b to be shown larger than a case where a frame line of the detection size of the second person 32b, that is, a size corresponding to the second section 34b indicated by a broken line is superimposed. In addition, since the size of the frame line 44 superimposed on the second person 32b is close to the size of the frame line 42 superimposed on the first person 32a, it is possible to more clearly present that the first person 32a and the second person 32b are located at substantially the same distance. In addition, since the ground positions 36a and 36b of the first person 32a and the second person 32b are matched with the lower ends of the frame lines 42 and 44, it is possible to more clearly present that the first person 32a and the second person 32b are located at the same distance depending on the lower end positions of the frame lines 42 and 44. As a result, it is possible to reduce the possibility of erroneously recognizing that the second person 32b exists farther than it actually exists, because the appearance of the second person 32b is small. For example, it is possible to reduce the possibility of erroneously recognizing that the second person 32b exists in the vicinity of the second distance L2 where the third person 32c having the appearance size equivalent to that of the second person 32b is located.

Figure 5:
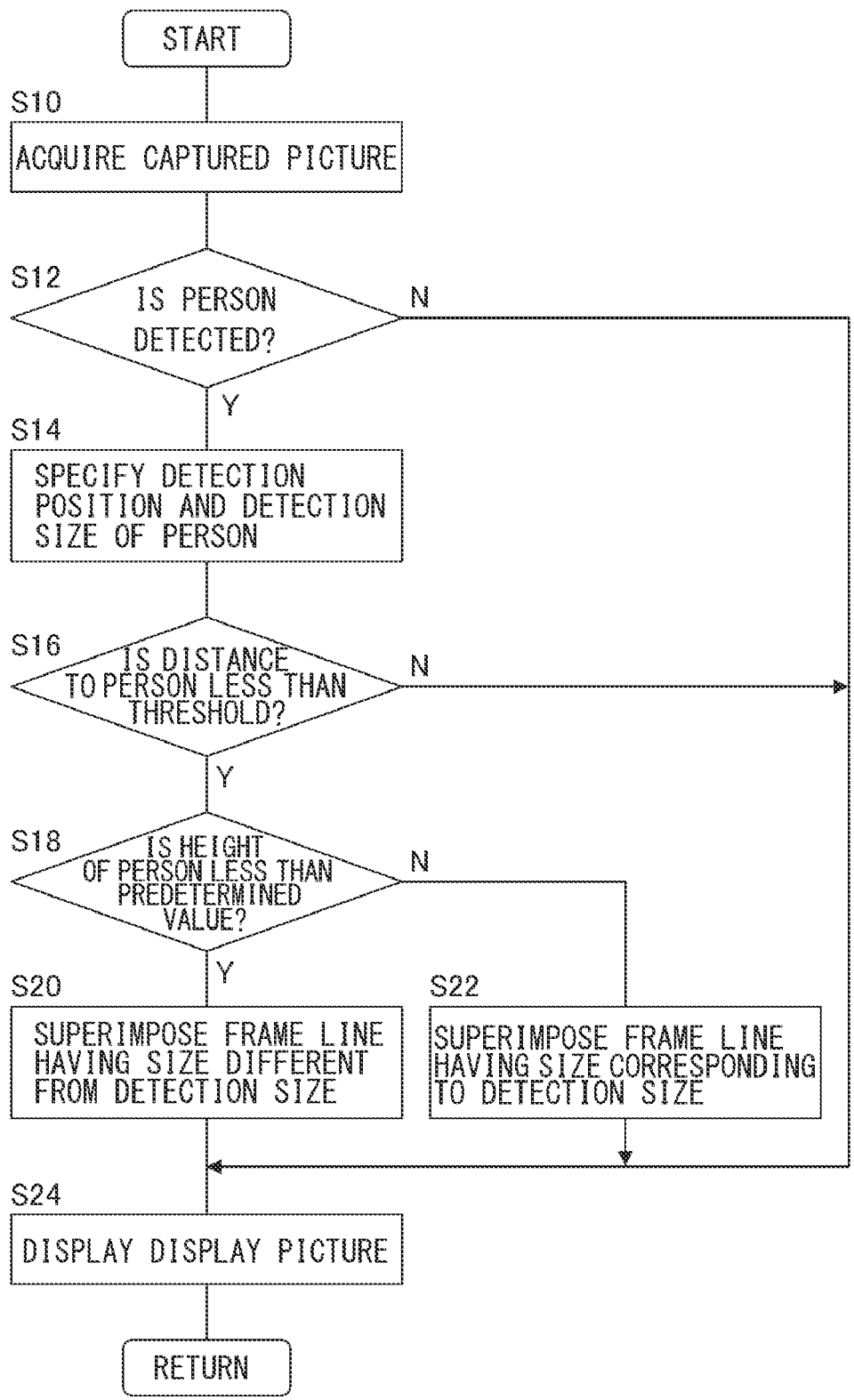
FIG. 5 is a flowchart illustrating a flow of a picture recognition method according to the first embodiment.

FIG. 5 is a flowchart illustrating a flow of a picture recognition method according to the first embodiment. In a case where the picture recognition apparatus 10 is mounted on the vehicle, the start and end of processing of FIG. 5 are started by the use start and end of the vehicle, the start and end of an engine, a power supply, or the like, and the like. Further, the start and the end may be performed by a user's operation or the like.

First, according to the start of the processing, the picture acquirer 12 acquires the captured picture 30 from the camera 26 (S10), and starts detecting a person included in the captured picture acquired by the person detector 14 (S12). When the person is detected (Y in S12), the person detector 14 specifies a detection position and a detection size of the person (S14). When a distance to the detected person is less than a threshold (Y in S16) and a height of the detected person is less than a predetermined value (Y in S18), the frame line determiner 16 determines a size of a frame line to be superimposed on the detection position of the person to be a size different from the detection size of the person, specifically, a size larger than the detection size of the person, and the picture generator 18 generates a display picture in which the frame line of the determined size is superimposed (S20). When the height of the detected person is not less than the predetermined value (N in S18), a display picture in which a frame line having a size corresponding to the detection size of the person is superimposed on the detection position of the person is generated (S22). The generated display picture is displayed on the display device 28 by the display controller 20 (S24). When the distance to the person is not less than the threshold (N in S16), the processing of S18 to S22 is skipped, and the frame line is not superimposed on the person. When no person is detected (N in S12), the processing of S14 to S22 is skipped, and the captured picture 30 in which the frame line is not superimposed is displayed as it is as a display picture (S24).

In the flow described above, when a plurality of persons are detected in the captured picture 30, the necessity of superimposing the frame line and the size of the frame line to be superimposed are determined for each of the plurality of detected persons by the processing of S12 to S22.

One aspect of the present embodiment may be a non-transitory program recording medium comprising a program. This program may be structured to cause a computer to implement: acquiring a captured picture; detecting a person included in the acquired captured picture and specifying a detection position and a detection size of the person in the captured picture; calculating a height of the person from the detection position and the detection size of the detected person; determining a size of a frame line different from the detection size on the basis of the calculated height of the person; generating a display picture in which the frame line of the determined size is superimposed on the detection position of the captured picture; and causing a display device to display the generated display picture.

Although the present invention has been described with reference to the above-described embodiment, the present invention is not limited to the above-described embodiment, and appropriate combinations or replacements of the respective configurations described in the embodiment are also included in the present invention.

In a modification of the first embodiment, a frame line for a person whose height is less than a predetermined value may be displayed in a mode different from that in FIG. 4. FIGS. 6A to 6D are diagrams illustrating display examples of other frame lines 44a to 44d corresponding to the frame line 44 illustrated in FIG. 4. An individual person 32 illustrated in FIG. 6 is a person who has a height less than the predetermined value.

Figures 6A, 6B, 6C, 6D:
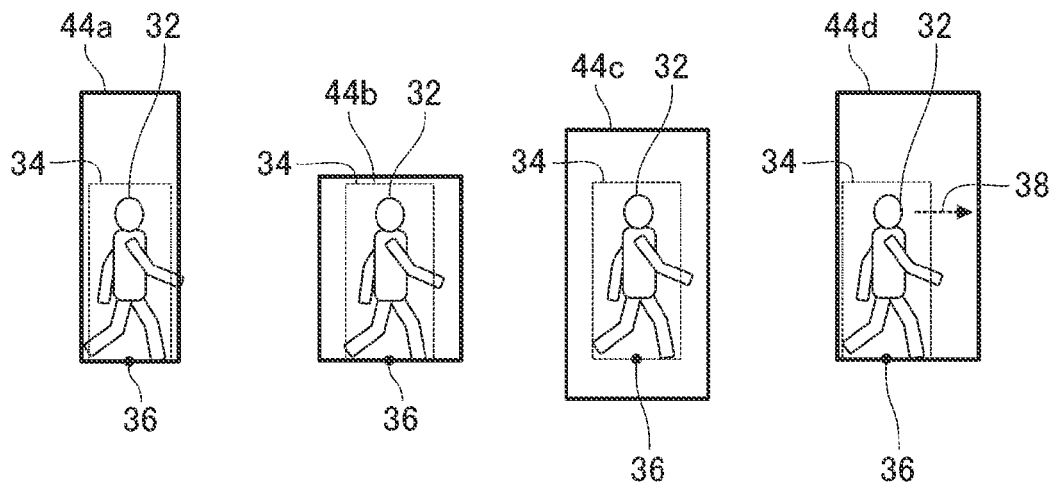
FIGS. 6A to 6D are diagrams illustrating another display example of the frame line.

In the frame line 44a illustrated in FIG. 6A, only a vertical size is large as compared with a size of a section 34 in which the person 32 is detected, and a horizontal size remains the same. Therefore, an aspect ratio of the frame line 44a in FIG. 6A is larger than about 2:1, which is an aspect ratio of a detection size of the person 32. The vertical size of the frame line 44a in FIG. 6A is larger than twice the horizontal size. For example, the vertical size is about 2.2 to 3.5 times larger than the horizontal size.

In the frame line 44b illustrated in FIG. 6B, only a horizontal size is large as compared with the size of the section 34 in which the person 32 is detected, and a vertical size remains the same. Therefore, an aspect ratio of the frame line 44b in FIG. 6B is smaller than about 2:1, which is an aspect ratio of the size of the section 34 in which the person 32 is detected. The horizontal size of the frame line 44b in FIG. 6B may be smaller than the vertical size of the frame line 44b, and may be, for example, about 0.6 to 1 times the vertical size.

The frame line 44c illustrated in FIG. 6C has the same shape and size as the frame line 44 in FIG. 4, but a superimposition position of the frame line 44c is different. A lower end of the frame line 44c in FIG. 6C is located below a ground position 36 of the person 32. A center position of the frame line 44c in FIG. 6C is matched with, for example, a center position of the section 34 where the person 32 is detected. By shifting and superimposing the frame line 44c downward, it is possible to give an impression that the person 32 exists closer, and it is possible to further emphasize the presence of the short person.

The frame line 44d illustrated in FIG. 6D has the same shape and size as the frame line 44 in FIG. 4, but a superimposition position of the frame line 44d is different, and the superimposition position is shifted in a left-right direction. The frame line 44d in FIG. 6D is shifted and superimposed in a movement direction or a gaze direction 38 of the detected person 32. In the example of FIG. 6D, the movement direction or the gaze direction 38 of the person 32 is a right direction, and the center of the frame line 44d is located on the right side of the ground position 36. By shifting and superimposing the frame line 44d in the movement direction or the gaze direction 38 of the person 32, the movement direction or the gaze direction 38 of the person 32 can be presented, and the behavior of the short person can be suggested. Note that, when the movement direction or the gaze direction 38 of the person 32 is not the left-right direction but a downward direction or an oblique direction, the superimposition position of the frame line 44d may be shifted in the downward direction or the oblique direction.

The movement direction of the person 32 may be specified on the basis of the transition of the person detection position for each frame of the captured picture as the moving picture, the direction of the limbs of the person, and the like. Further, the gaze direction 38 of the person 32 may be specified on the basis of the direction of the face of the person 32, and the direction of the face of the person 32 may be regarded as the gaze direction 38. The direction of the face of the person 32 is specified on the basis of a detection result of the person by the person detector 14.

In the above-described embodiment, the case where the lower end of the detected section is set to the ground position has been described. In another embodiment, the ground position may be detected on the basis of the picture content of the detected section. For example, in a case where the feet of the person included in the detected section are hidden and invisible, the height of the person may be estimated on the basis of the position and size of the head of the person included in the detected section, and the ground position may be detected on the basis of the estimation result of the height.

In the above-described embodiment, the case where the necessity of the frame line or the color of the frame line is determined according to the distance to the person has been described. In another embodiment, the necessity of the frame line or the color of the frame line may be determined on the basis of the detection position of the person. For example, the frame line determiner 16 may hold the position coordinates in the vertical direction of the captured picture corresponding to the distance (for example, 20 m or 40 m) serving as the above-described threshold as a threshold, and determine the necessity of superimposing the frame line or the color of the frame line on the basis of the threshold of the position coordinates.

In the above-described embodiment, the case where the size of the frame line for the person whose height is less than the predetermined value is set to the size different from the detection size of the person by enlarging the frame line in the vertical direction or the like, and the frame line having the size different from the detection size of the person is superimposed has been described. In another embodiment, a first frame line corresponding to the detected size and a second frame line having a size larger than the size of the first frame line in the vertical direction may be superimposed on a person whose height is less than a predetermined value. In this case, the frame line surrounding the detected person is a double frame line. In addition, an outline or the like drawn so as to trace the outer shape of the person whose height present in the frame line enlarged in the vertical direction is less than the predetermined value may be added to the frame line and superimposed.

In the above-described embodiment, the frame line is not superimposed on the person whose distance is larger than or equal to the threshold. In another embodiment, a frame line may be superimposed on a person whose distance is larger than or equal to the threshold. For example, when a person whose distance is less than the threshold is not detected, a frame line may be superimposed on a person whose distance is larger than or equal to the threshold. The frame line may be superimposed on the person whose distance is larger than or equal to the threshold regardless of whether or not the person whose distance is less than the threshold is detected.

In the above-described embodiment, the case where the size of the frame line for the person whose height is less than the predetermined value is set to a size different from the detection size of the person by enlarging the frame line in the vertical direction or the like, and the frame line having the size different from the detection size of the person is superimposed has been described. In another embodiment, the necessity of such processing may be determined according to the distance between the person whose height is less than the predetermined value and the person whose height is larger than or equal to the predetermined value. For example, in a case where there is a person whose height is larger than or equal to the predetermined value in the vicinity of the person whose height is less than the predetermined value, for example, in a range corresponding to 2 m, the distance to the person whose height is less than the predetermined value is less likely to be erroneously recognized due to the presence of the person whose height is larger than or equal to the predetermined value. Therefore, in a case where there is no person whose height is larger than or equal to the predetermined value in the vicinity of the person whose height is less than the predetermined value, for example, in a predetermined range such as 2 m, the size of the frame line for the person whose height is less than the predetermined value may be set to a size different from the detection size of the person.

In the above-described embodiment, the case where the distance to the person detected by the person detector 14 is calculated and the height of the detected person is calculated has been described. In another embodiment, instead of the person detector 14, the distance to the person detected by the frame line determiner 16 may be calculated, and the height of the detected person may be calculated. In this case, the person detector 14 may detect a person included in the captured picture acquired by the picture acquirer 12 and specify a detection position and a detection size of the person in the captured picture. The frame line determiner 16 may determine the size of the frame line different from the detection size on the basis of the detection position of the person specified by the person detector 14. The frame line determiner 16 may calculate the height of the person from the detection position and the detection size of the person specified by the person detector 14, and determine the size of the frame line different from the detection size on the basis of the height of the person calculated by the frame line determiner 16. When the height of the person calculated by the frame line determiner 16 is less than the predetermined value, the frame line determiner 16 may set the size of the frame line to a size larger than the detection size at least in the vertical direction.

Second Embodiment

Next, a second embodiment of the present invention will be described with reference to the drawings. In the second embodiment, a size of a frame line different from a detection size of a person is determined on the basis of the detection position and the detection size of the person without calculating a height of the person. Hereinafter, the second embodiment will be described focusing on differences from the first embodiment, and drawings or description of common points with the first embodiment will be omitted as appropriate.

Figure 7:
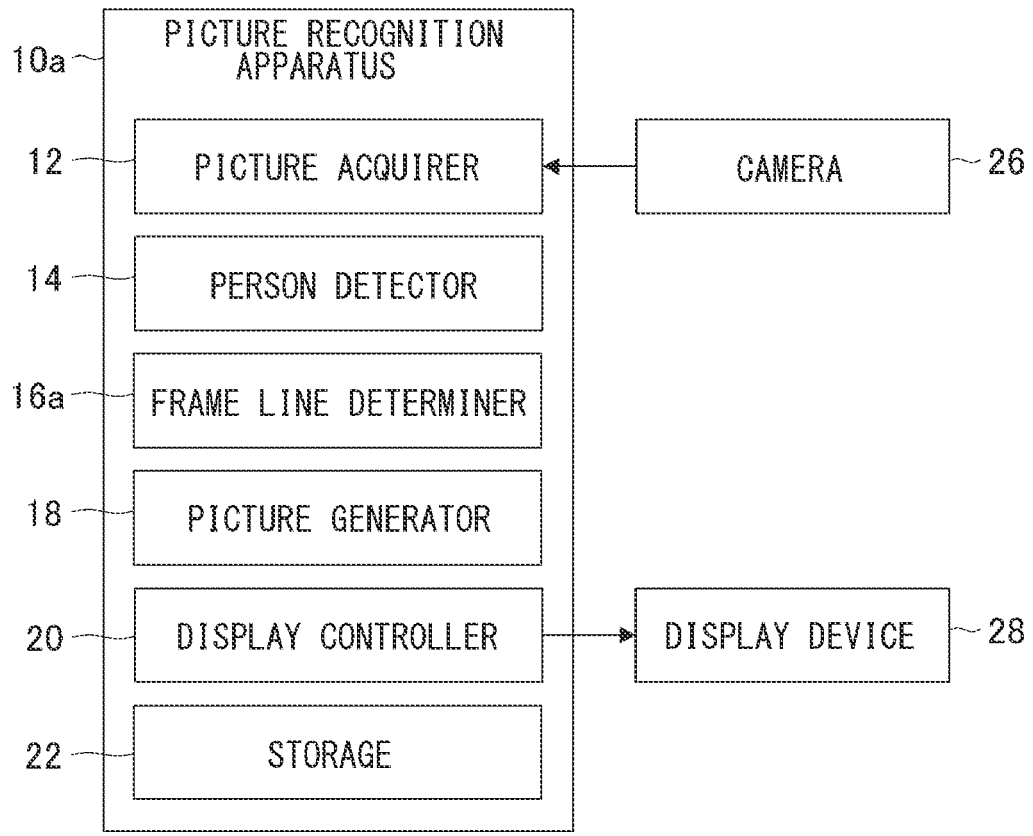
FIG. 7 is a block diagram schematically illustrating a functional configuration of a picture recognition apparatus according to a second embodiment.

FIG. 7 is a block diagram schematically illustrating a functional configuration of a picture recognition apparatus 10a according to the second embodiment. The picture recognition apparatus 10a includes a picture acquirer 12, a person detector 14a, a frame line determiner 16a, a picture generator 18, a display controller 20, and a storage 22. In the second embodiment, the picture acquirer 12, the picture generator 18, the display controller 20, and the storage 22 are structured similarly to the first embodiment.

The person detector 14a detects a person included in a captured picture acquired by the picture acquirer 12, and specifies a detection position and a detection size of the detected person. The person detector 14a detects a person included in the captured picture by processing similar to that of a person detector 14 according to the first embodiment, and specifies a detection position and a detection size of the detected person. Unlike the person detector 14 according to the first embodiment, the person detector 14a may not calculate the height of the detected person.

The frame line determiner 16a determines the size of the frame line different from the detection size on the basis of the detection position of the person specified by the person detector 14a. The frame line determiner 16a is different from the first embodiment in that the size of the frame line is determined on the basis of the detection position of the person and a prescribed size according to the detection position, instead of determining the size of the frame line according to the height of the person. Specifically, when the detection size of the person detected by the person detector 14a is less than the prescribed size according to the detection position, the size of the frame line is determined such that the size of the frame line is larger than the detection size at least in a vertical direction. The prescribed size according to the detection position is, for example, equivalent to a detection size of a person having a height of 170 cm present at the detection position. The prescribed size may change according to the detection position. For example, the prescribed size may be increased when the detection position in the captured picture is lower, and the prescribed size may be decreased when the detection position in the captured picture is higher. The prescribed size according to the detection position is stored in advance in the storage 22, for example. The prescribed size according to the detection position can be determined using a table, a mathematical formula, or the like indicating a correlation between the detection position and the prescribed size. The frame line determiner 16a may be structured similarly to the frame line determiner 16 according to the first embodiment, except for the processing of determining the size of the frame line.

Processing of the person detector 14a and the frame line determiner 16a will be described with reference to FIG. 3. The person detector 14a detects a first person 32a, and specifies a detection size of a section 34a where the first person 32a is detected and a detection position (that is, a ground position 36a). The frame line determiner 16a compares the detection size of the first person 32a with the prescribed size according to the ground position 36a of the first person 32a. In a case where the prescribed size corresponds to a detection size of a person having a height of 170 cm and the height of the first person 32a is larger than or equal to 170 cm, the detection size of the first person 32a is larger than or equal to the prescribed size according to the ground position 36a. In this case, the frame line determiner 16a determines the detection size of the section 34a in which the first person 32a is detected as the size of the frame line.

The person detector 14a detects a second person 32b, and specifies a detection size of a section 34b where the second person 32b is detected and a detection position (that is, a ground position 36b). The frame line determiner 16a compares the detection size of the second person 32b with the prescribed size according to the ground position 36b of the second person 32b. In a case where the prescribed size corresponds to a detection size of a person having a height of 170 cm and the height of the second person 32b is about 100 cm, the detection size of the second person 32b is less than the prescribed size according to the ground position 36b. In this case, the frame line determiner 16a determines, as the size of the frame line, a size larger than the detection size of the section 34b in which the second person 32b is detected at least in the vertical direction. The frame line determiner 16a may determine the same size as the prescribed size according to the ground position 36b as the size of the frame line of the second person 32b.

Figure 8:
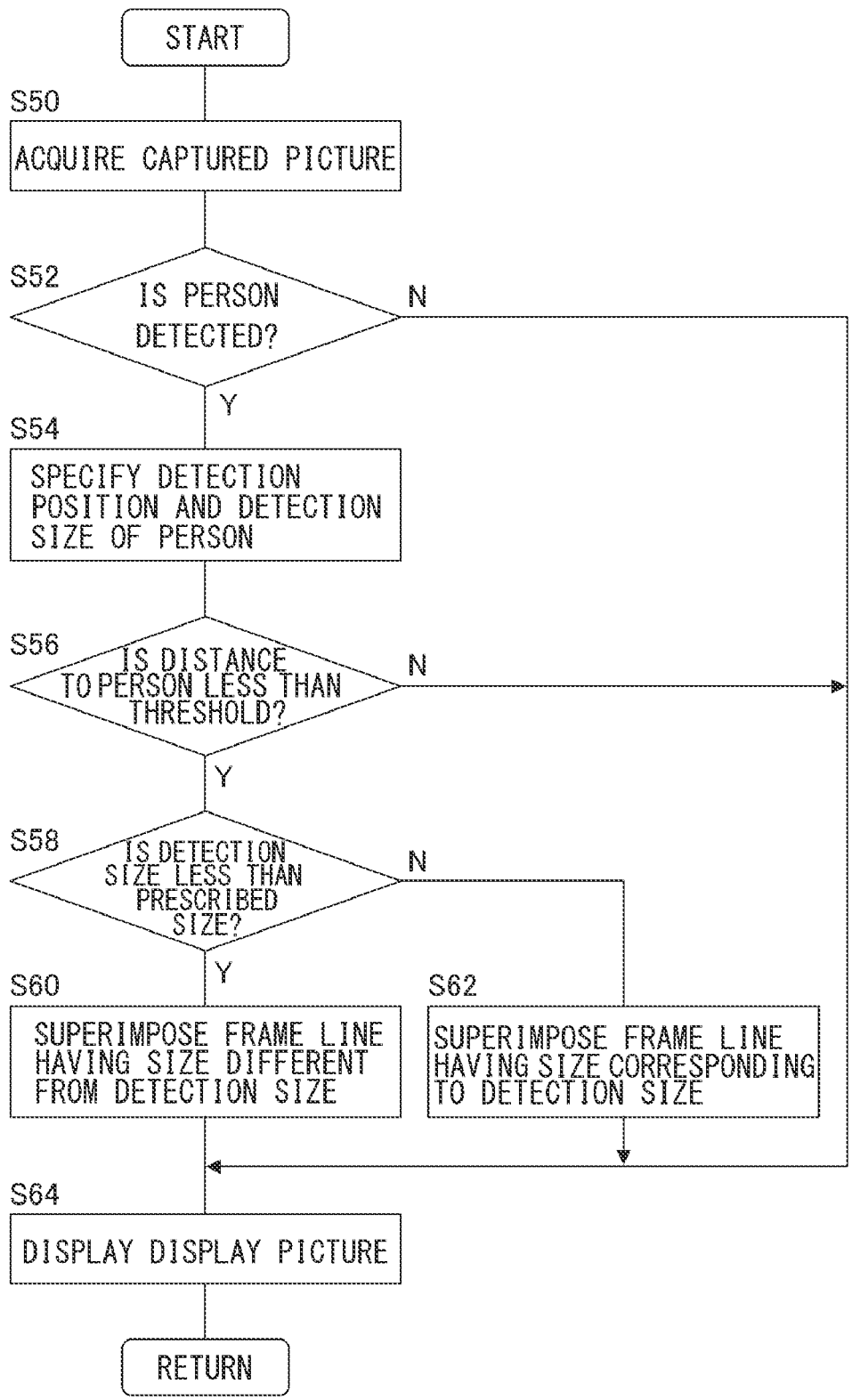
FIG. 8 is a flowchart illustrating a flow of a picture recognition method according to the second embodiment.

FIG. 8 is a flowchart illustrating a flow of a picture recognition method according to the second embodiment. The picture acquirer 12 acquires a captured picture 30 from a camera 26 (S50), and detects a person included in the captured picture acquired by the person detector 14 (S52). When the person is detected (Y in S52), the person detector 14 specifies a detection position and a detection size of the person (S54). When a distance to the detected person is less than a threshold (Y in S56) and the detection size of the detected person is less than a prescribed size according to the detection position (Y in S58), the frame line determiner 16 determines the size of the frame line to be superimposed on the detection position of the person to be a size different from the detection size of the person, specifically, a size larger than the detection size of the person, and the picture generator 18 generates a display picture in which the frame line of the determined size is superimposed (S60). When the detection size of the detected person is not less than the prescribed size according to the detection position (N in S58), a display picture in which a frame line having a size corresponding to the detection size of the person is superimposed on the detection position of the person is generated (S62). The generated display picture is displayed on the display device 28 by the display controller 20 (S64). When the distance to the person is not less than the threshold (N in S56), the processing of S58 to S62 is skipped, and the frame line is not superimposed on the person. When no person is detected (N in S52), the processing of S54 to S62 is skipped, and the captured picture 30 in which the frame line is not superimposed is displayed as it is as a display picture (S64).

Also in the second embodiment, effects similar to those of the first embodiment can be obtained. The modification of the first embodiment can also be applied to the second embodiment.

In the above-described embodiment, the case where the distance to the person is calculated on the basis of the captured picture has been described. In another embodiment, the distance to the person may be measured using a sensor different from the camera 26. For example, any distance measuring sensor such as an ultrasonic sensor, a radar sensor, or light detection and ranging (LIDAR) may be used.

In the above-described embodiment, the case where the picture recognition apparatus 10 is mounted on the vehicle has been described. In another embodiment, the installation location of the picture recognition apparatus 10 is not particularly limited, and may be used for any purpose.

What is claimed is:

1. A picture recognition apparatus comprising a memory storing executable instructions that, in response to execution, cause a processor to perform operations comprising:
   acquiring a captured picture;
   detecting a person included in the captured picture and specifying a detection position and a detection size of the person in the captured picture;
   determining a size of a bounding box such that:
   a) the size of the bounding box is set to a size larger than the detection size at least in a vertical direction when the detection size of the person is less than a prescribed size according to the detection position; and
   b) the size of the bounding box is set to a size same as the detection size at least in a vertical direction when the detection size of the person is larger than or equal to the prescribed size according to the detection position;
   generating a display picture in which the frame bounding box of the determined size is superimposed on the detection position of the captured picture; and
   causing a display device to display the generated display picture.

2. The picture recognition apparatus according to claim 1, wherein the processor further performs operations comprising calculating a height of the person from the detection position and the detection size of the person, and determines the size of the bounding box on the basis of the calculated height of the person.

3. The picture recognition apparatus according to claim 2, wherein the processor further performs operations comprising setting the size of the bounding box to a size larger than the detection size at least in a vertical direction when the height of the person detected by the person detector is less than a predetermined value.

4. The picture recognition apparatus according to claim 1, wherein the processor further performs operations comprising:
   specifying a ground position of the person in the captured picture, and
   generating a display picture in which the bounding box is superimposed such that a lower end of the frame line having the size determined by the frame line determiner is located at the ground position.

5. The picture recognition apparatus according to claim 1, wherein the processor further performs operations comprising:
   specifying a ground position of the person in the captured picture, and
   generating a display picture in which the bounding box is superimposed such that a lower end of the frame line having the size determined by the frame line determiner is located below the ground position.

6. A picture recognition method in which a picture recognition apparatus executes:
   acquiring a captured picture;
   detecting a person included in the acquired captured picture and specifying a detection position and a detection size of the person in the captured picture;
   determining a size of a bounding box such that:
   a) the size of the bounding box is set to a size larger than the detection size at least in a vertical direction when the detection size of the person is less than a prescribed size according to the detection position; and
   b) the size of the bounding box is set to a size same as the detection size at least in a vertical direction when the detection size of the person is larger than or equal to the prescribed size according to the detection position;

generating a display picture in which the bounding box of the determined size is superimposed on the detection position of the captured picture; and causing a display device to display the generated display picture.

7. A non-transitory program recording medium comprising a program for causing a computer to execute:

acquiring a captured picture;

detecting a person included in the acquired captured picture and specifying a detection position and a detection size of the person in the captured picture;

determining a size of a bounding box such that
 a) the size of the bounding box is set to a size larger than the detection size at least in a vertical direction when the detection size of the person is less than a prescribed size according to the detection position, and
 b) the size of the bounding box is set to a size same as the detection size at least in a vertical direction when the detection size of the person is larger than or equal to the prescribed size according to the detection position;

generating a display picture in which the bounding box of the determined size is superimposed on the detection position of the captured picture; and causing a display device to display the generated display picture.

* * * * *